(12) United States Patent
Clark et al.

(10) Patent No.: US 7,795,872 B2
(45) Date of Patent: Sep. 14, 2010

(54) DETERMINING CORRECTION FACTORS REPRESENTING EFFECTS OF DIFFERENT PORTIONS OF A LINING STRUCTURE

(75) Inventors: Brian Clark, Sugar Land, TX (US);
Frank Morrison, Berkeley, CA (US);
Edward Nichols, Berkeley, CA (US);
Hong Zhang, El Sobrante, CA (US);
Richard A. Rosthal, Richmond, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 251 days.

(21) Appl. No.: 11/868,379

(22) Filed: Oct. 5, 2007

(65) Prior Publication Data

US 2009/0091328 A1   Apr. 9, 2009

(51) Int. Cl.
*G01V 3/18*   (2006.01)
*G01V 3/00*   (2006.01)
(52) U.S. Cl. .............................. 324/338; 324/337
(58) Field of Classification Search ............. 324/332, 324/333, 334, 337, 338, 339, 344, 368; 702/6, 702/7, 11; 175/50; 166/250.01, 66
See application file for complete search history.

(56) References Cited

U.S. PATENT DOCUMENTS

| 5,260,661 | A | 11/1993 | Vail, III |
| 6,294,917 | B1 * | 9/2001 | Nichols ....................... 324/339 |
| 6,393,363 | B1 | 5/2002 | Wilt et al. |
| 6,597,178 | B1 | 7/2003 | Nichols et al. |
| 6,969,994 | B2 * | 11/2005 | Minerbo et al. ............. 324/343 |
| 7,030,617 | B2 | 4/2006 | Conti |
| 2005/0156602 | A1 | 7/2005 | Conti |
| 2006/0011385 | A1 | 1/2006 | Seydoux et al. |
| 2006/0082374 | A1 | 4/2006 | Xiao et al. |

FOREIGN PATENT DOCUMENTS

EP   01795920   6/2007

OTHER PUBLICATIONS

Xu, W. et al., Influence of Steel Casings on Electromagnetic Signals, Geophysics vol. 59, No. 3, 1994, pp. 378-390.
ETT-DB Maintenance Manual Provisory Edition, Chapter 4 Theory of Operation available through InTouch.
Lee, K.H. et al., Electromagnetic Method for Analyzing the Property of Steel Casing, Lawrence Berkeley National Laboratory, LBNL-41525, 1998.
Lee, Ki Ha et al., Electromagnetic Fields in a Steel-Cased Borehole, Geophysical Prospecting, 2005, 53, pp. 13-21.

* cited by examiner

*Primary Examiner*—Kenneth J Whittington
(74) *Attorney, Agent, or Firm*—James L. Kunka; Jonna T. Flores; Darla P. Fonseo

(57) ABSTRACT

To determine effect on a magnetic field caused by a lining structure in a wellbore, an array may be deployed into the wellbore lined with the lining structure. The array comprises a plurality of sensors including sensor A configured to operate as a transmitter, sensor B configured to operate as either a transmitter or a receiver, and sensor C configured to operate as a receiver. The array measures magnetic fields using sensor B as a receiver and sensor C in response to activation of sensor B as a transmitter and sensor A. A plurality of lining structure correction factors can be calculated based on the measured magnetic fields, based on the reciprocity of the sensors.

22 Claims, 7 Drawing Sheets

DETERMINING CORRECTION FACTORS REPRESENTING EFFECTS OF DIFFERENT PORTIONS OF A LINING STRUCTURE

TECHNICAL FIELD

The invention relates generally to determining correction factors representing effects of different portions of a lining structure using measurements from an array having at least one transmitter and plural receivers.

BACKGROUND

Geological formations form reservoirs for the accumulation of hydrocarbons in the subsurface of the earth. Such formations contain networks of interconnected paths in which fluids are disposed that ingress or egress from the reservoir. Knowledge of both the porosity and permeability of the geological formations are useful to determine the behavior of the fluids in this network. From information about porosity and permeability, efficient development and management of hydrocarbon reservoirs may be achieved. Considering that hydrocarbons are electrically insulating and most water contains highly conductive salts, resistivity measurements are a valuable tool in predicting the presence of a hydrocarbon reservoir in the formations.

One technique to measure formation resistivity involves the use of electromagnetic induction using transmitters of low frequency magnetic fields that induce electrical currents in the formation. The induced currents in turn produce secondary magnetic fields that are measured in an adjacent wellbore (or at some distance away in the same wellbore) by a magnetic field receiver.

The performance of a magnetic field receiver or a magnetic field transmitter positioned within a wellbore casing may be compromised by the casing's effect on the magnetic field to be measured. Specifically, the measurable magnetic field induces a current that flows concentrically about the receiver coil and tends to reduce the magnetic field within the casing. The magnetic permeability of the casing also acts to distort the magnetic field and influences the behavior of the currents. The measurable magnetic field may be highly attenuated as a result and the measurements made by the receiver may be influenced by variations in attenuation caused by variations in the casing's conductivity, permeability, thickness and diameter. Often, a cased wellbore reduces the magnetic field signal to a level that is undetectable by standard receivers. Moreover, the variance in conductivity, permeability, thickness and diameter along a longitudinal axis of a length of casing makes it difficult to determine an attenuation factor (which represents attenuation of the measurable magnetic field caused by the casing) at any selected point. The inability to determine an attenuation factor at a selected point along the casing may cause errors in field measurements that are not easily corrected.

SUMMARY

In one aspect, the invention relates to a method of determining an effect on a magnetic field caused by a lining structure in a wellbore. The method includes deploying, into the wellbore lined with the lining structure, an array comprising a plurality of sensors including sensor A configured to operate as a transmitter, sensor B configured to operate as either a transmitter or a receiver, and sensor C configured to operate as a receiver. The method further includes measuring magnetic fields using sensor B as a receiver in response to activation of sensor A and sensor C in response to activation of sensor B as a transmitter and sensor A. The method additionally includes calculating, based on the measured magnetic fields, a plurality of lining structure correction factors.

In another aspect, the invention relates to a system comprising an array of elements and a controller. The array of elements is deployable into a wellbore lined with an electrically conductive lining structure. The elements comprise a plurality of sensors including sensor A configured to operate as a transmitter, sensor B configured to operate as either a transmitter or a receiver, and sensor C configured to operate as a receiver. The controller is operable to activate sensor A and sensor B as a transmitter in turn (not simultaneously), measure a plurality of electric fields at sensor C and sensor B as a receiver; and compute a plurality of lining correction factors based on the measurements.

In another aspect, the invention relates to another method. The method includes deploying an array comprising a plurality of sensors, at least one of which is configured to operate as either a transmitter or a receiver into a wellbore comprising an electrically conductive tubular structure. The method also includes activating a plurality of the sensors as transmitters. The method additionally includes operating a plurality of the sensors as receivers to measure electric fields between couplings of the plurality of sensors. The method also includes calculating a plurality of correction factors for the electrically conductive tubular structure based on the measurements.

Other or alternative features will become apparent from the following description, from the drawings, and from the claims.

DETAILED DESCRIPTION

Figure 1:
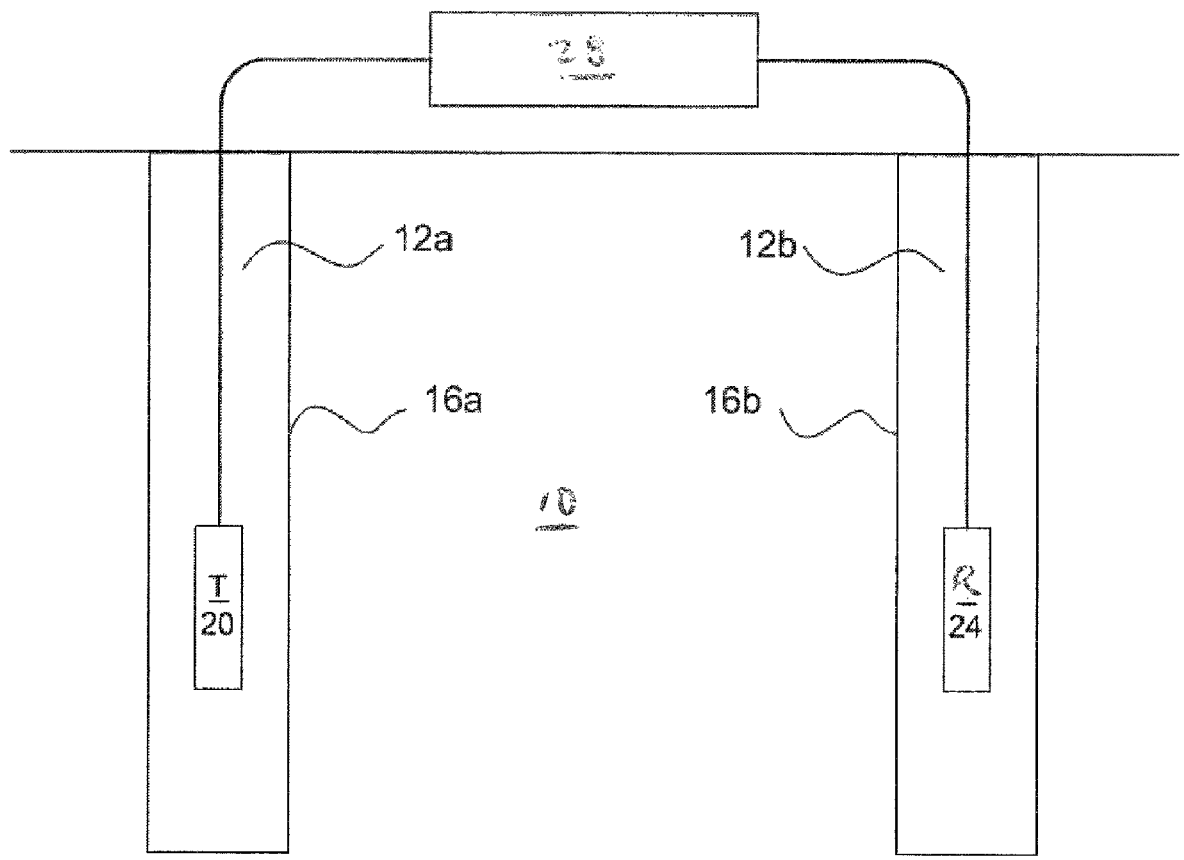
FIGS. 1 and 2 depict conventional prior art transmitter/receiver arrangements for conducting electromagnetic (EM) inductive surveys of a subterranean formation.

In the following description, numerous details are set forth to provide an understanding of the present invention. However, it will be understood by those skilled in the art that the present invention may be practiced without these details and that numerous variations or modifications from the described embodiments are possible.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms may refer to a left to right orientation, a right to left orientation, or a diagonal orientation as appropriate. Further, while the most common situation is one where the axis of symmetry of the magnetic field produced by the transmitter or measured by the receiver is aligned with the borehole, this method applies to arbitrary orientations of transmitter or receiver.

An electromagnetic (EM) induction survey technique is provided for surveying a subterranean formation. In one transmitter/receiver arrangement, the survey is performed using cross-well logging, in which EM transmitters are placed in one wellbore and EM receivers are placed in a second wellbore. In alternative transmitter/receiver arrangements, the surveying can be performed with surface-to-wellbore (or wellbore-to-surface) logging. In surface-to-wellbore logging, EM transmitters are placed at or near the surface (e.g., land surface, sea floor) or towed in a body of water, and EM receivers are placed in a wellbore. In wellbore-to-surface logging, EM transmitters are placed in a wellbore, while EM receivers are placed at or near a surface (e.g., land surface, sea floor) or towed in a body of water. In single well logging, the transmitters are place in the same wellbore as the receivers. The EM induction survey technique disclosed with the present application corrects for the effect of an electrically conductive lining structure (e.g., a casing or liner used to line an inner surface of a wellbore) on measurements taken during logging. The correction is accomplished by adding auxiliary sensors (e.g., EM transmitters and/or EM receivers) to a logging tool string that is deployed into a wellbore. The auxiliary sensors (transmitters and/or receivers) produce measurements from which lining structure correction factors can be computed to represent effects of portions of the lining structure. These auxiliary transmitters and/or receivers may include any sensor that can measure a dc or ac magnetic field, including for example a loop (coil) assembly disposed around a magnetic core, or fluxgate magnetometers.

The EM induction survey technique according to various embodiments is beneficial in that the technique accounts for lining structure inhomogeneity. Often, a lining structure does not have constant properties along its length. Rather, a lining structure (which can be formed of a material such as steel or other metal) is inhomogeneous in that the conductivity, permeability, thickness and diameters of the lining structure can vary along its length. The presence of coupling devices (such as collars) and of centralizers adds to the inhomogeneity. Due to the inhomogeneous nature of a typical lining structure, conventional EM induction survey techniques have not properly or adequately corrected for attenuation effects of the lining structure.

Although computation of lining structure correction factors is discussed in the context of surveying a subterranean structure, techniques according to some embodiments can be used in other applications, such as to remove double indications of defects ("ghosting" effect) of a lining structure (or pipe or other electrically conductive tubular structure) in a tool that uses eddy current methods to inspect such an electrically conductive tubular structure.

FIG. 1 shows conventional equipment used in the measurement of geological (subterranean) formation 10 resistivity between two wellbores 12a and 12b using EM induction. A transmitter T (20) is located in one wellbore 12a, while a receiver R (24) is placed in another wellbore 12b. The transmitter T 20 and receiver R 24 are coupled to a controller 28 that controls activation of the transmitter T 20 and to receive measurement data from the receiver R 24. Alternatively, there may be two independent controllers that are synchronized with each other. The transmitter T 20 typically includes a coil (not shown) having a multi-turn loop (having $N_T$ turns of wire) wrapped around a magnetically permeable core (mu-metal or ferrite) with a cross-sectional $A_T$. The transmitter T 20 may further include a capacitor (not shown) for tuning the frequency of the coil. When an alternating current, $I_T$, at frequency $f_0$ passes through the multi-turn loop, a time varying magnetic moment, $M_T$, is produced in the transmitter T 20. The magnetic moment is defined as follows:

$$M_T = N_T I_T A_T. \qquad \text{(Eq. 1)}$$

The magnetic moment $M_T$ produces a magnetic field $B_R$ that can be detected by the receiver R 24. In a short form, the response may be governed by the following:

$$B_R = k_f M_T. \qquad \text{(Eq. 2)}$$

The geological factor, $k_f$, is a function of the electrical conductivity distribution of the geological formation 10 between the transmitter 20 and the receiver 24. In a practical survey, $M_T$ is known (through the measurement of $I_T$). The receiver R 24 typically includes one or more antennas (not shown). Each antenna includes a multi-turn loop of wire wound around a core of magnetically permeable metal or ferrite. The changing magnetic field sensed by the receiver R 24 creates an induced voltage in the receiver coil (not shown). The induced voltage ($V_R$) is a function of the detected magnetic field ($B_R$), the frequency ($f_0$), the number of turns ($N_R$) of wire in the receiver coil, the effective cross-sectional area of the coil ($A_R$), and the effective permeability ($\mu_R$) of the coil. Thus, $V_R$ is proportional to:

$$f_0 B_R N_R A_R \mu_R. \qquad \text{(Eq. 3)}$$

While $f_0$ and $N_R$ are known, the product, $A_R \mu_R$, is difficult to calculate. In practice, these constants may be grouped together as $k_R$, and Eq. 3 may be simplified as:

$$V_R = k_R B_R, \qquad \text{(Eq. 4)}$$

where $k_R = f_0 N_R A_R \mu_R$.

Thus, instead of determining the product $A_R \mu_R$, it is more convenient to determine $k_R$ according to the following procedures. First, the receiver coil is calibrated in a known field, at a known frequency. Then, the exact value for $k_R$ is derived from the magnetic field ($B_R$) and the measured voltage ($V_R$) according to the following equation:

$$k_R = B_R / V_R \qquad \text{(Eq. 5)}$$

When the system is placed in a conducting geological formation 10, the time-varying magnetic field, $B_R$, which is produced by the transmitter magnetic moment $M_T$, produces a voltage in the geological formation 10, which in turn drives a current, $I_1$, in the formation. The current, $I_1$, is proportional to the conductivity of the geological formation and is concentric about the longitudinal axis of the wellbore if the formation is azimuthally symmetric about the axis of the transmitter. The magnetic field proximate to the wellbore results from a free space field called the primary magnetic field, while the field resulting from current $I_1$ is called the secondary magnetic field. In more complex geological formations or when the wells are far apart compared to a skin depth in the formation, there are higher order terms and the relationship between voltage and formation conductivity is more complicated. In addition, for an arbitrary orientation of a transmitter, the fields are more complicated. The process of determining the spacial distribution of formation conductivity from the measurements is known as inversion. A discussion of inversion is beyond the scope of this patent.

The current $I_1$ is typically out of phase with respect to the transmitter current, $I_T$. At very low frequencies, where the inductive reactance is small, the current $I_1$ is proportional to dB/dt and is 90° out of phase with respect to $I_T$. As the frequency increases, the inductive reactance of the formation 10 increases, and the phase of the induced current $I_1$ increases to greater than 90°. The secondary magnetic field induced by current $I_1$ also has a phase shift relative to the induced current $I_1$, and the total magnetic field as detected by receiver R 24 is complex.

The complex magnetic field detected by receiver R 24 may thus be separated into two components: a real component, $B_R$, which is in-phase with the transmitter current, $I_T$, and an imaginary (or quadrature) component, $B_1$, which is phase-shifted by 90°. The values of the real component, $B_R$, and the quadrature component, $B_1$, of the magnetic field at a given frequency and geometrical configuration uniquely specify the electrical resistivity of a homogeneous formation pierced by the wellbores 12a and 12b. In an inhomogeneous geological formation, however, the complex field is measured at a succession of points along the longitudinal axis of the receiver wellbore for each of a succession of transmitter locations. The multiplicity of measurements thus obtained can be used to determine the inhomogeneous resistivity distribution between the wellbores 12a and 12b. The method described above with regard to ac measurements (equations 3 and 4) will also work equally well for dc measurements (such as could be used for well positioning). The same approach can be applied to dc magnetic fields.

The discussion above assumes that the wellbores 12a and 12b are not lined with an electrically conductive or magnetically permeable lining structure, such as a metallic casing. FIG. 1 depicts casing 16a and 16b lining wellbores 12a and 12b respectively. The electrically conductive or magnetically permeable casings 16a and 16b interfere with resistivity measurements. Additionally, it may occur that only one of the wells is lined with an electrically conductive or magnetically permeable casing and that the other is either unlined (open hole) or lined with a plastic or fiberglass casing which does not interfere with the electric or magnetic fields.

Inside of a conductive and magnetic lining structure, the net effective moment of the transmitter ($M_{eff}$) is reduced by the eddy currents that are induced in the lining structure, and magnetic shielding due to the magnetic property of the lining structure. These effects act to reduce the moment of the transmitter as seen from outside. The degree of this reduction depends upon the properties of the casing, the design of the transmitter and the frequency of operation. At high frequencies the shielding is nearly perfect and very little field is observed outside of casing. For this reason, the technique described above is limited to low frequencies in metal-cased wells. The effective moment, the moment seen by a receiver outside the conductive lining structure, is conveniently expressed by:

$$M_{eff} = k_c M_T,  \quad (\text{Eq. 6})$$

where $k_c$ is the lining structure attenuation factor. While we have spoken of the attenuation, note that the constant $k_c$ is complex. Not only is the moment attenuated, but the phase is changed.

An analogous situation is present with respect to a receiver if it is surrounded by a conductive lining structure, and the situation is exacerbated if both the transmitter and the receiver are surrounded by conductive lining structures.

Figure 2:
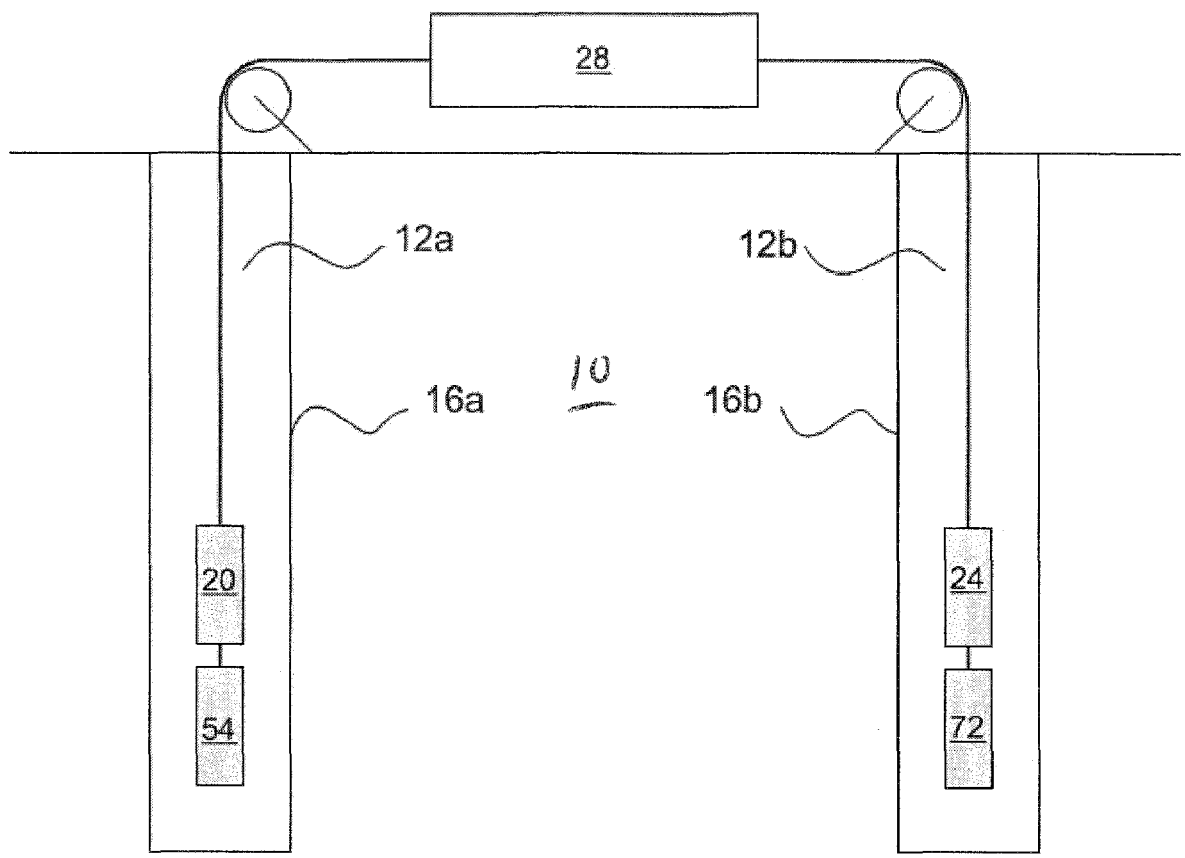

As depicted in FIG. 2, a conventional surveying technique that attempts to correct for the casing effect utilizes an auxiliary receiver 54 and an auxiliary transmitter 72 in conjunction with the principal transmitter 20 and principal receiver 24 depicted in FIG. 1. The principal transmitter 20 and auxiliary receiver 54 are disposed in the wellbore 12a, and the principal receiver 24 and auxiliary transmitter 72 are disposed in the wellbore 12b.

The wellbores 12a and 12b are lined with casings 16a and 16b. In addition to general attenuation, the conductive casings 16a, 16b are typically non-homogenous and they include couplers (collars) and centralizers which add to the inhomogeneities. For example, the properties of a casing may vary from one depth to another. To mitigate effects of such casing inhomogeneity, the correction technique according to FIG. 2 includes the auxiliary receiver 54 in the proximity of the principal transmitter 20. The auxiliary receiver 54 is also referred to as an "offset monitor," since it is a sensor to measure magnetic field in the casing some distance away from the transmitter. The auxiliary receiver 54 permits detection of a magnetic field, $B_a$, close to the transmitter, where characteristics are dependent primarily on the casing properties (not on the formation properties). The magnetic field, $B_a$, at auxiliary receiver 54 can then be used to correct for casing attenuation effects in the magnetic field that is induced in the principal receiver 24. Specifically, a magnetic field $B_a$ is induced in the auxiliary receiver 54. The magnetic field $B_a$ is related to the magnetic moment, $M_T$, of transmitter 20, a casing attenuation factor $k_{TR}$, and a geometric factor $\alpha$. This relation is expressed as follows:

$$B_a = \alpha k_{TR} M_T \quad (\text{Eq. 7})$$

The casing attenuation factor (also referred to as a casing corrector factor), $k_{TR}$ is a function of the properties of conductive liner 16a. Because auxiliary receiver 54 is inside liner 16a and in close proximity (e.g., ≦5-10 m) to transmitter 20, the magnetic field $B_a$ sensed by auxiliary receiver 54 is dominated by the properties of the conductive liner 16a. Note that the casing factor $k_{TR}$ is not equal to the casing $k_c$ factor from equation 6. The casing factor $k_{TR}$ does not represent the magnetic moment as seen by a sensor at some distance outside of the well, due to the fact that this casing factor includes the influence of the casing on the transmitter and also includes the effect of the casing on the monitor receiver. If the transmitter and receiver had the same design and if they were far enough apart but not seeing the formation and if the transmitter were operated in the linear regime and if the casing properties were the same at the transmitter and at the receiver, then we might write:

$$k_T = \sqrt{k_{TR}} \quad (\text{Eq. 8})$$

Unfortunately, it is seldom the case that the transmitter and receiver are the same design, far apart, and operated in linear regime or that the casing is homogeneous. Typically, the auxiliary receiver has a different construction than the transmitter and the transmitter is not operated in a linear regime. Thus, this measurement provides only an approximate means to partially correct the transmitter moment for casing effect.

In a similar manner, an auxiliary transmitter 72 in the second wellbore 12b can be used to correct the effects of the casing 16b on the far receiver 24. As with the auxiliary receiver 54, the auxiliary transmitter 72 is placed in close proximity with the receiver 24 so that the magnetic field at the receiver 24 depends only on the casing and not on the formation. Similar procedures for performing corrections are followed for transmitter/receiver pair 72, 24 as with the transmitter-receiver pair 20, 54.

The technique of FIG. 2 and equation 8 may not produce accurate results for a number of reasons. The transmitter 20 and auxiliary receiver 54 (or the receiver 24 and auxiliary transmitter 72) may be of different designs, or the transmitter 20 may be operated in a non-linear manner, or the casing may be different at the transmitter 20 and auxiliary receiver 54 (or the receiver 24 and auxiliary transmitter 72) or the auxiliary sensor may not be the correct distance from the main sensor. Specifically, operation of a transmitter in non-linear fashion refers generally to the magnetic field output from the transmitter as a function of drive current, while non-linearity operation is mainly caused by magnetic hysterises loss inside transmitter core. By comparison, linear operation versus non-linear operation for the receiver is based on the pickup voltage of receiver as a function of the strength of external magnetic field. Any of these common situations will cause errors in the casing correction method used for arrangements as shown in FIG. 2.

In the ensuing discussion, reference is made to casings and casing effects; however, the techniques discussed can also be applied to other lining structures (or other conductive or magnetic tubular structures).

Figure 3:
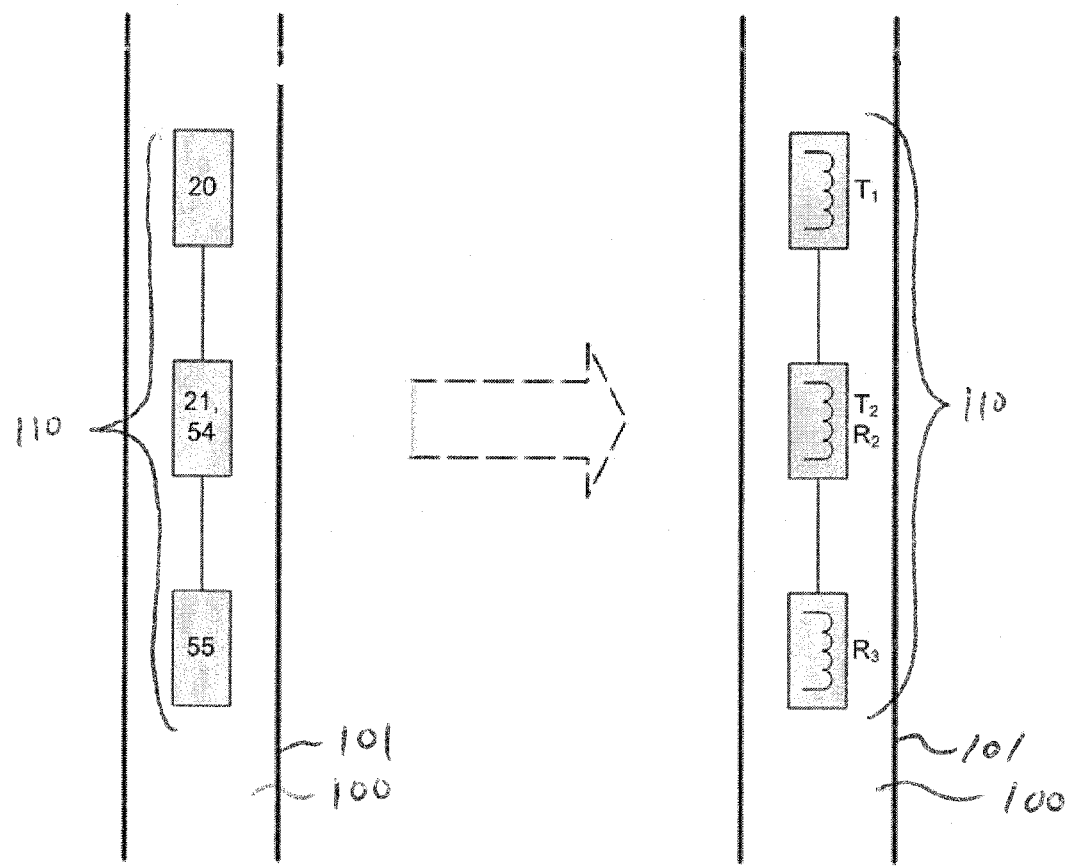
FIG. 3 illustrates a transmitter/receiver arrangement according to embodiments of the present disclosure to enable determination of lining structure correction factors using an array of EM transmitters and receivers.

In general, to perform casing effect correction for a casing of arbitrary inhomogeneity, an array of transmitters and receivers can be used, such as the array 110 of transmitters and receivers depicted in the arrangement of FIG. 3. The array 110 depicted in FIG. 3, deployed in a wellbore 100, includes a primary transmitter 20, an auxiliary transmitter 21, a first auxiliary receiver 54, and a second auxiliary receiver 55. The first auxiliary receiver 54 and auxiliary transmitter 21 are provided at the same location in the wellbore 100 (within the same box as depicted in FIG. 3).

Since transmitters and receivers both include multi-turn solenoids on mu-metal cores, the transmitters and receivers can serve a dual role so that in fact 21 and 54 can be implemented with the same physical device but selectively connected either to a current source (as a transmitter) or to an amplifier (as a receiver). Alternatively, instead of using a single multi-turn coil for both receiving and transmitting, two coils wound on a common core can be used.

To simplify the ensuing description, the array 110 of transmitters 20, 21 and receivers 54, 55 are equivalently represented as transmitters $T_1$, $T_2$ (respectively) and receivers $R_1$, $R_2$ (respectively), as shown in FIG. 3. The array 110 of transmitters $T_1$, $T_2$ and receivers $R_1$, $R_2$ are deployed in a wellbore 100, which is lined with casing 101.

Modeling has shown that for typical casing and frequency of operation, if the axial spacing between a transmitter and receiver located in the same wellbore is greater than about a particular distance (such as, for some embodiments, five meters), the casing attenuation factors at the transmitters and receivers are independent of each other. For example, the magnetic field at receiver $R_2$ due to transmitter $T_1$, $B_2^1$ (the superscript indicates the transmitter involved, the subscript the receiver in question) is given simply by:

$$B_2^1 = B_{02}^1 k_1 k_2, \qquad (\text{Eq. 10})$$

where $B_{02}^1$ is the free space (no casing) magnetic field at $R_2$, which can be calculated since the separation between $T_1$ and $R_2$ is known and the moment, $M_T$ is known from measurement of the current in the transmitter $T_1$. A free space magnetic field B for a transmitter whose moment is oriented in the z-direction can be calculated according to:

$$B = \frac{\mu_o \mu M_T}{4\pi r^3} \left( \frac{2x^2}{r^2} \bar{u}_x + \frac{3xy}{r^2} \bar{u}_y + \frac{3xz}{r^2} \bar{u}_z \right) \qquad (\text{Eq. 11})$$

where r is the distance between the transmitter and receiver, $\bar{u}_x, \bar{u}_y, \bar{u}_z$ are unit vectors in the x, y, and z directions, respectively, $\mu_0$ is the permeability of vacuum, and $\mu$ is the relative permeability of the formation.

In Eq. 10, the attenuation factor $k_1$ represents the casing attenuation at the transmitter $T_1$, and the attenuation factor $k_2$ represents the casing attenuation at the first auxiliary receiver $R_2$.

Similarly, the magnetic field at the second auxiliary receiver $R_3$ due to the transmitter $T_1$ is given by:

$$B_3^1 = B_{03}^1 k_1 k_3, \qquad (\text{Eq. 12})$$

where $k_3$ represents the casing attenuation at the second auxiliary receiver $R_3$.

If the auxiliary transmitter $T_2$ (instead of $T_1$) is activated, then the measured field at the second auxiliary receiver $R_3$ is given by:

$$B_3^2 = B_{03}^2 k_2 k_3. \qquad (\text{Eq. 13})$$

These equations can be solved as follows:

$$k_1 = \sqrt{\frac{\frac{B_3^1}{B_{03}^1} \frac{B_2^1}{B_{02}^1}}{\frac{B_3^2}{B_{03}^2}}} \qquad (\text{Eq 14})$$

$$k_2 = \sqrt{\frac{\frac{B_3^2}{B_{03}^2} \frac{B_2^1}{B_{02}^1}}{\frac{B_3^1}{B_{03}^1}}}$$

$$k_3 = \sqrt{\frac{\frac{B_3^1}{B_{03}^1} \frac{B_3^2}{B_{03}^2}}{\frac{B_2^1}{B_{02}^1}}}$$

From the above, the three unknowns, $k_1$, $k_2$, and $k_3$ can be readily derived based on measured and calculated magnetic fields. The casing attenuation factor $k_1$ for the principal transmitter, $T_1$ (20 in FIG. 3), can be obtained from measurements using the array 110 that includes the principal transmitter, an auxiliary transmitter, and two auxiliary receivers. The transmitter attenuation factor, previously denoted by $k_c$ (in Eq. 6), and here denoted by $k_1$, is the casing attenuation factor seen by a distant receiver, for example cross-well receiver 24 in FIG. 4 (located in wellbore 102). Effectively, based on a number of measurements made by plural receivers of the array 110 in the casing 101, the casing effect of the principal transmitter 20 (represented by $k_1$ or $k_c$) can be derived. Note that the measurements made by the plural receivers include the strength of the transmitter moment. One virtue of this method is that it applies even if the transmitter is operated in a nonlinear regime. This method gives a means to accurately correct for the effect of an electrically conductive and/or permeable lining structure on an external measurement using only local measurements internal to the well.

The above is based on a number of observations. When a receiver is inside a casing, then the receiver's coupling with a distant receiver (such as a receiver located in another wellbore or a receiver in the same wellbore located a large distance away) is equal to the coupling that would have existed in the absence of a casing times a casing attenuation factor. This casing attenuation factor is a function of the casing properties in the vicinity of the receiver and is independent of the location or characteristics of the distant receiver or of the formation. Another observation is that when two receivers are located a sufficient distance apart, then the coupling between two receivers inside a casing is equal to the coupling that would exist in the absence of casing times a product of casing attenuation factors, one for each of the sensors.

The magnetic field $B_R$ measured at receiver 24 due to EM fields induced by the principal transmitter 20 is:

$$B_R = k_c k_f M_T. \tag{Eq. 15}$$

Since $M_T$ is known, simply dividing both sides by b $k_c M_T$ yields the desired formation attenuation factor $k_f$.

The computations discussed above can be performed by a controller 104 (FIG. 4) that is electrically connected to the array of transmitters and receivers 20, 21, 54, 55 (in wellbore 100) and remote receiver 24 (in wellbore 102). The controller 104, which can include a computer, transceiver circuitry, and other circuitry, controls operation of transmitters and receives measured signals from the receivers in wellbores 100 and 102. The computer can include one or more processors and software executable on the processors to discuss the various computations discussed herein. Alternatively, the controller can be programmed to simply collect all the necessary data and the calculations can be performed later.

Note that while the array of transmitters and receivers in wellbore 100 can be used to perform a casing effect correction for casing 101 in the first the wellbore 100, a similar array of transmitters and receivers can be provided in the second wellbore 102 to perform casing effect correction for casing 103 in the second wellbore 102 if both wells are cased. As depicted in FIG. 5, in addition to the principal receiver 24 ($R_4$) located in the wellbore 102 inside casing 103, an auxiliary receiver 59 ($R_5$) is also provided, as well as auxiliary transmitters 57 and 61 ($T_3$, $T_4$). The transmitters $T_3$, $T_4$ and receivers $R_4$, $R_5$ make up a second array 111 located in the second wellbore 102. The auxiliary transmitters $T_3$ and $T_4$ are placed in close proximity to receivers $R_4$ and $R_5$ (similar to placement of transmitters and receivers in the array 110) such that activation of the transmitters $T_3$ and $T_4$ will generate three sets of magnetic fields as measured by receivers $R_4$ and $R_5$. The technique discussed above in connection with FIG. 4 is applied to derive casing attenuation factors for the casing in the second wellbore 102.

Note that a logging tool that has a receiver string often includes multiple receivers. Thus, the provision of auxiliary receivers may not be necessary, since a receiver string already includes multiple receivers.

Figure 6:
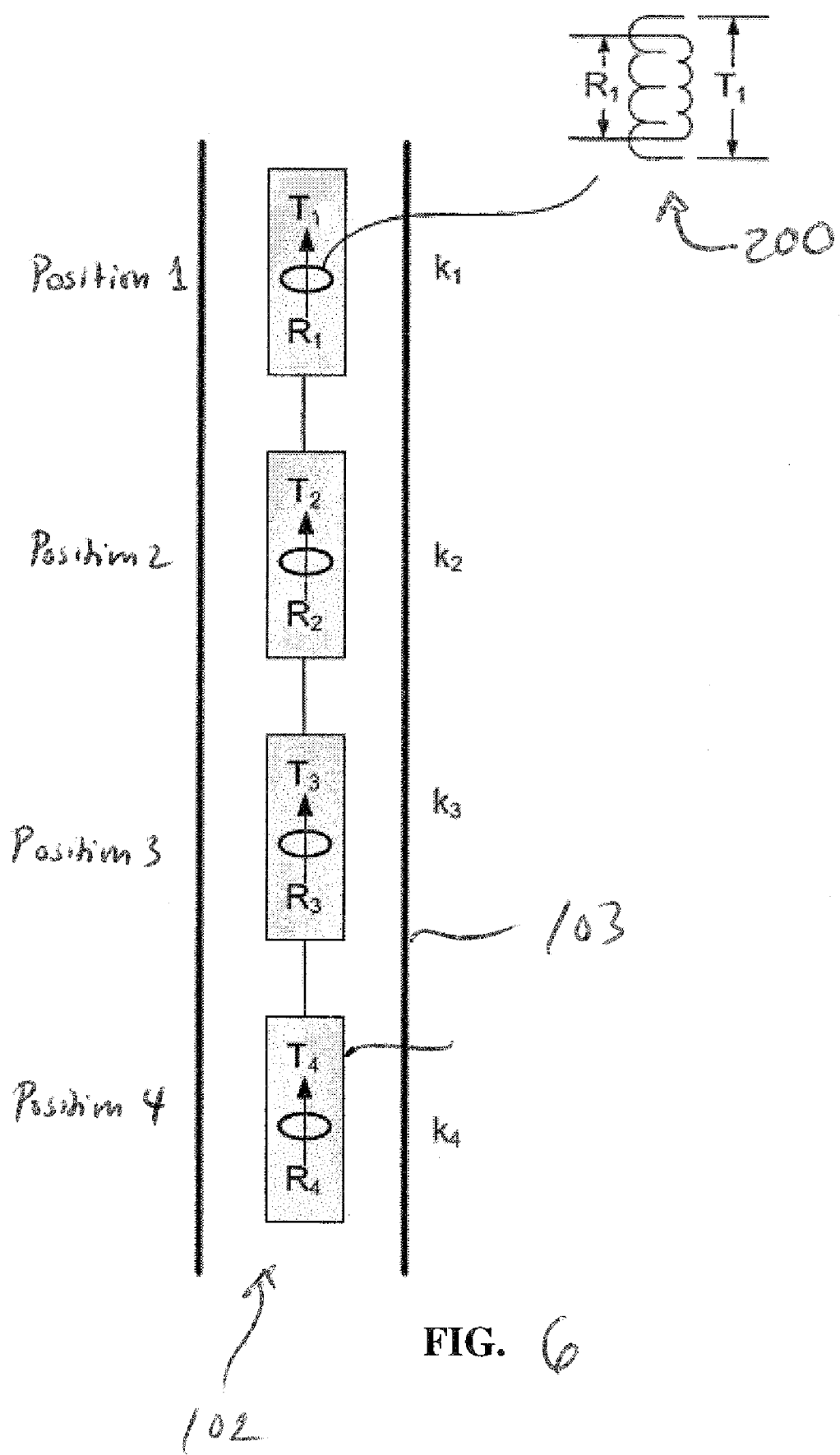
FIG. 6 illustrates an alternative transmitter/receiver arrangement according to embodiments of the present disclosure to enable determination of lining structure correction factors.

In another example, FIG. 6 shows a receiver string that includes four receivers $R_1$, $R_2$, $R_3$, and $R_4$. The string of receivers is deployed in the wellbore 102 that is lined with casing 103. In addition to the receivers, the array depicted in FIG. 6 also includes transmitters $T_1$, $T_2$, $T_3$, and $T_4$.

The array of FIG. 6 thus includes multiple elements, where each element of the array is composed of a transmitter $T_i$, with moment $M_i$, and a receiver $R_i$ (i=1, 2, 3, 4 in the four-element array of FIG. 6). Each element can include a co-located transmitter and receiver, where the transmitter and receiver are implemented with coils located on a common core, as indicated by 200 in FIG. 6. Alternatively, the sense coil of the receiver can be driven as a transmitter.

The geometric factor, $\alpha$, varies for each combination so, for example, $\alpha_{ij}$ is the geometric factor for receiver i and transmitter j. There is a unique casing attenuation factor for each $T_i$-$R_i$ element denoted by $k_1$ (shown schematically as $k_1$, $k_2$, $k_3$ and $k_4$ in FIG. 6). The field measured by a specific receiver, $R_i$, from a specific transmitter, $T_j$, is denoted by $B_i^j$. Thus $B_1^2 = \alpha_{12} k_1 k_2 M_2$ is the field measured at position 1 from a transmitter located at position 2 and it has been attenuated by a factor $k_2$ (at the transmitter) and $k_1$ (at the receiver). Further, to simplify the following equations, it should be noted that $\alpha_{12} M_2$ is the free space field that would be measured at receiver 1 from transmitter 2, denoted here as $B_{01}^2$, and can be calculated from a knowledge of $M_2$ and the geometry of the array.

Figure 4:
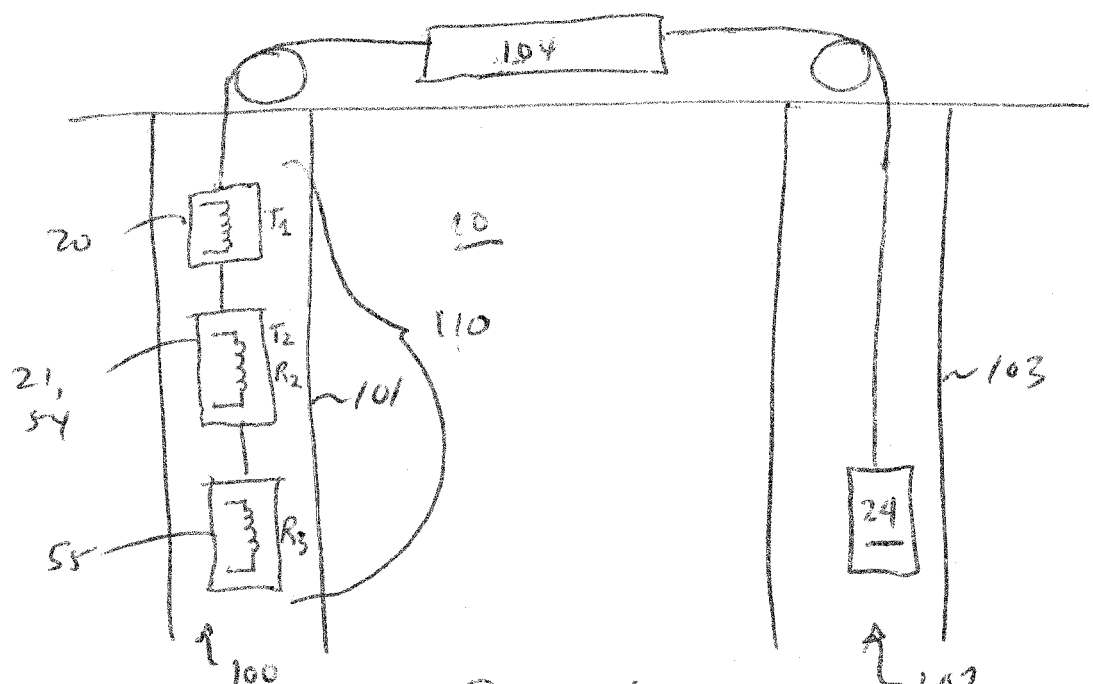
FIGS. 4 and 5 illustrate various cross-well surveying techniques according to embodiments of the present disclosure employing the array of FIG. 3.
Figure 5:
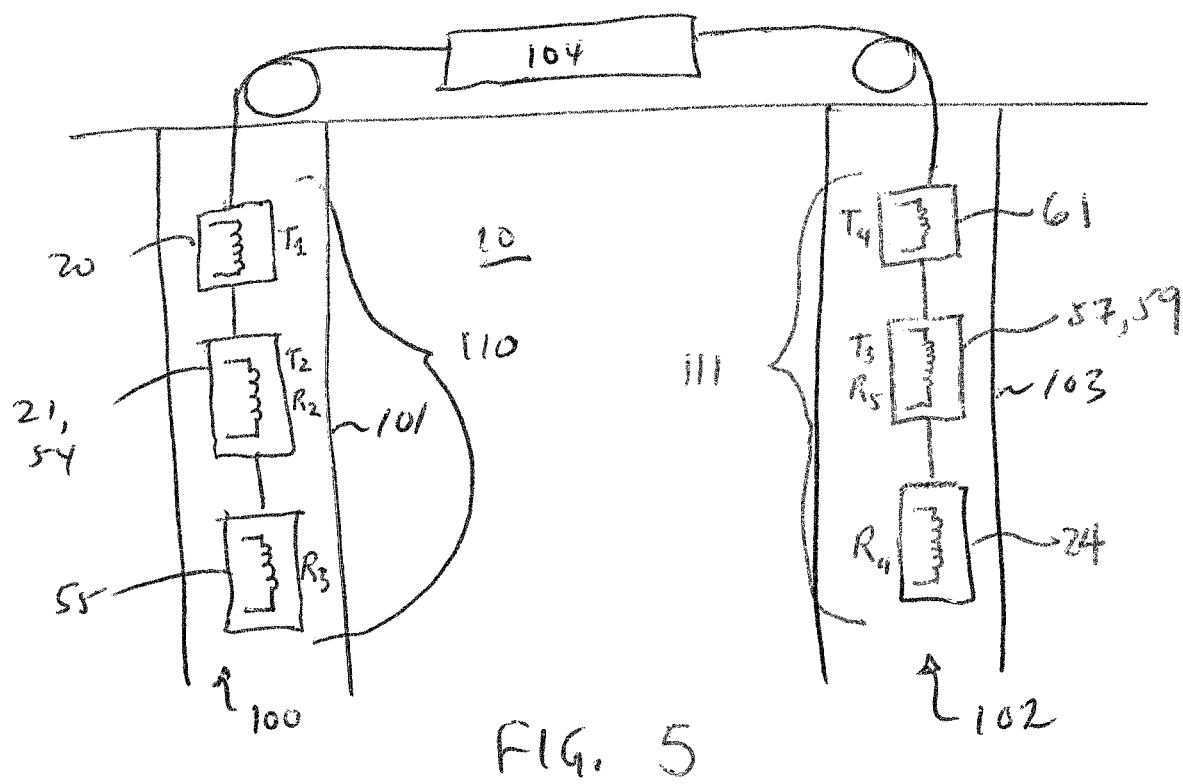

Proceeding in the manner for the array depicted in FIGS. 3 and 4, multiple measurements are made between various transmitter-receiver pairs to determine $k_1$, $k_2$, $k_3$ and $k_4$. For example:

$$B_2^1 = B_{02}^1 k_1 k_2, \tag{Eq. 16}$$

$$B_3^1 = B_{03}^1 k_1 k_3, \tag{Eq. 17}$$

$$B_3^2 = B_{03}^1 k_2 k_3. \tag{Eq. 18}$$

As before, $$k_2 k_3 = \frac{B_3^2}{B_{03}^2}. \tag{Eq. 19}$$

Taking the ratio of $B_2^1$ to $B_3^1$ yields $$\frac{B_2^1}{B_3^1} = \frac{B_{02}^1}{B_{03}^1} \frac{k_2}{k_3}, \tag{Eq. 20}$$

and solving for $k_3$, $$k_3 = \sqrt{\frac{B_3^2}{B_{03}^2} \frac{B_3^1}{B_{03}^1} \frac{B_{02}^1}{B_2^1}} \tag{Eq. 21}$$

Other pairs of T and R yield similar equations to solve for each of the attenuation factors, $k_i$.

The above equations express the determination of the casing attenuation factor of the transmitter based on measured and computed magnetic fields. The following describes how the casing attenuation factors of transmitters and receivers can be expressed in terms of impedances. The impedances are defined as the ratio of V/I where V is the voltage measured by a receiver divided by the current at a transmitter.

Reciprocity exists between a transmitter and a receiver in straight mode so long as the transmitter is operated in the linear region. In straight mode, the voltage measured by a receiver is the open-circuit voltage in the main coil of the receiver. In other words, the main coil of the receiver is connected to a measurement circuit to measure the voltage with the measurement circuit having a high input impedance such that little current flows. Ideally, the measurement circuit has infinite input impedance such that no current flows in the coil so that the voltage measured is a true open-circuit voltage.

A transmitter mimics a receiver in straight mode. That is, if there are two receivers each including coils wound about magnetic cores, then if receiver 1 is excited with current $I_1$ and the voltage $V_2^1$ on receiver 2 is measured, or if receiver 2 is excited with current $I_2$ and the voltage $V_1^2$ on receiver 1 is measured, then $$Z_{12} = \frac{V_2 1}{I_1} = Z_{21} = \frac{V_1 2}{I_2}. \qquad \text{(Eq. 22)}$$

In Eq. 22, $Z_{12}$ is the impedance representing the coupling from receiver 1 to 2, and $Z_{21}$ represents the coupling from receiver 2 to receiver 1. Note that according to Eq. 22, in straight mode, the impedances $Z_{12}$ and $Z_{21}$ have the same values.

Figure 7:
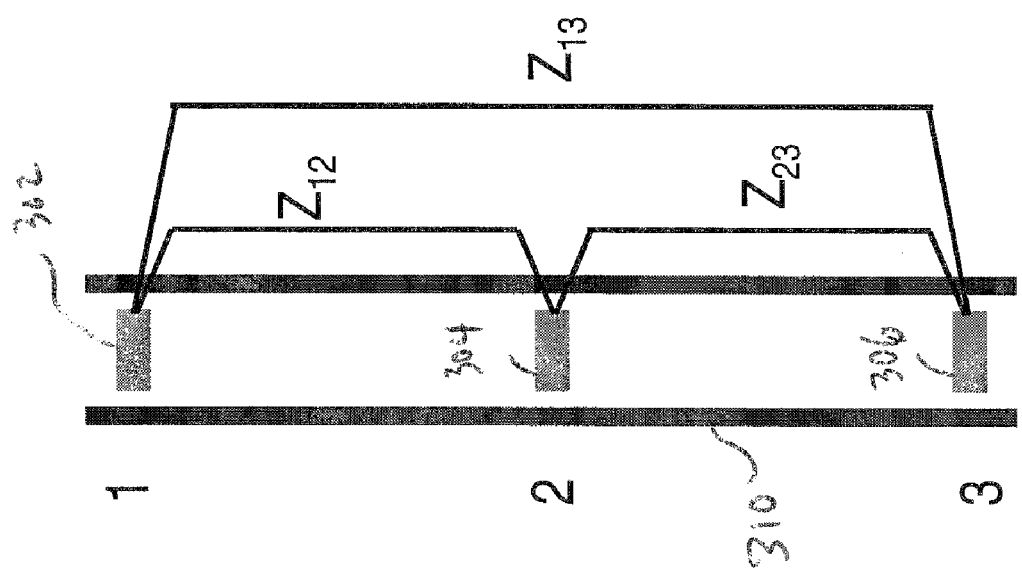

FIG. 7 illustrates a transmitter/receiver arrangement that includes three receivers 302, 304, and 306, where at least two of the receivers can also be operated as a transmitter. More generally, 302, 304, and 306 are referred to as elements 302, 304, and 306, which are disposed in a casing 310. With the elements positioned in the casing 310 and subjected to an external field (a magnetic field that is propagated from a remote transmitter, either from crosswell, or surface, or the same well), the impedances $Z_1$, $Z_2$, and $Z_3$ of the elements 302, 304, and 306, respectively, are expressed as follows:

$Z_1 = k_1 Z_{1,0}$, $Z_2 = k_2 Z_{2,0}$, $Z_3 = k_3 Z_{3,0}$, (Eq. 23)

where the notation $Z_{N,0}$ (N=1, 2, or 3) indicates the voltage that would have been read by receiver N in the absence of the casing 310.

If all the couplings between these three receivers are measured:

$Z_{12} = k_{12} Z_{12,0}$, $Z_{13} = k_{13} Z_{13,0}$, $Z_{23} = k_{23} Z_{23,0}$. (Eq. 24)

Based on the assumption that a coupling between receivers inside a casing is equal to the coupling that would have existed in the absence of casing multiplied by a product of a casing attenuation factor, and the reciprocity assumption in straight mode, both discussed above, $k_{12} = k_1 k_2$, $k_{13} = k_1 k_3$, $k_{23} = k_2 k_3$. (Eq. 25)

Each of the individual coefficients can be derived:

$$k_1 = \sqrt{\frac{k_{12} k_{13}}{k_{23}}},$$

$$k_2 = \sqrt{\frac{k_{12} k_{23}}{k_{13}}},$$

$$k_3 = \sqrt{\frac{k_{13} k_{23}}{k_{12}}}. \qquad \text{(Eq. 26)}$$

Note that $k_{12}$, $k_{13}$, $k_{23}$, are readily derived based on measured voltages at receivers in response to excitations of transmitters in the same casing, according to the arrangement of FIG. 2. Note that $k_{12}$, $k_{13}$, $k_{23}$ are derived from $Z_{12}$, $Z_{13}$, and $Z_{23}$, according to Eq. 24, where $Z_{12}$, $Z_{13}$, and $Z_{23}$ are derived based on measured voltages $V_{12}$, $V_{13}$, and $V_{23}$ at receivers 302, 304, 306, respectively, in response to the excitation of appropriate transmitters in the same casing 310. The voltage $V_{12}$ is the measured voltage at receiver 304 in response to the excitation of transmitter 302. $V_{13}$ is the voltage measured at receiver 306 in response to the excitation of transmitter 302. $V_{23}$ is the measured voltage at receiver 306 in response to the excitation of transmitter 304.

The techniques discussed above assume that the receivers are operated in straight mode. There is, however, also another mode in which a receiver can be operated: feedback mode. In feedback mode, the main coil voltage of the receiver is used to generate a current in the feedback coil that partially cancels the main coil voltage. The degree of cancellation is frequency dependent and depends upon the details of the electronics that generate the current. The casing effect in straight mode is different from the casing effect in feedback mode. Moreover, the casing effect in feedback mode changes if the feedback circuit is changed.

In feedback mode, the reciprocity assumption discussed above, where $Z_{12} = Z_{21}$, is no longer true. In other words, there is no reciprocity between a straight mode transmitter and a feedback mode receiver. Thus, to measure the casing effect for a receiver in feedback mode, the procedure is to first measure the casing effect for the receiver in straight mode, and then to compute the casing effect for the feedback mode using a ratio of the signal in feedback mode to the signal in straight mode, by measuring the ratios $$\frac{V_{Feedback\_Casing}}{V_{Straight\_Casing}} \text{ and } \frac{V_{Feedback\_Air}}{V_{Straight\_Air}},$$

thereby obtaining the feedback sensor casing correction factor as $$k_{Feedback} = k_{Straight} \frac{V_{Feedback\_Casing} V_{Straight\_Air}}{V_{Straight\_Casing} V_{Veedback\_Air}}. \qquad \text{(Eq. 27)}$$

In the discussion above, reference has been made to using a single multi-turn coil for implementing both a receiver and a transmitter. In other words, the single multi-turn coil can be operated to selectively receive a signal or transmit a signal.

However, in practice it may be difficult to optimize a single multi-turn coil for both receiving and transmitting. In general, receiver coils have a large number of turns to produce a large voltage, while transmitter coils have a smaller number of turns to minimize inductance. It may be desirable to have two coils wound on the same core and use one for the transmitter and the other for the receiver. The casing effect of a receiver is dependent upon the particular design of the receiver, including the arrangement of coil and core and how feedback is used. If a second coil is used as a transmitter, then its geometrical layout should be as similar to the receiver coil, as much as possible, in order to result in a similar casing effect.

Calibration of the transmitter (where "calibration" refers to deriving the casing attenuation factor for the transmitter) presents some additional issues, particularly when the transmitter is run in a highly nonlinear mode while in casing. In other words, the effective transmitter moment, as seen by a receiver far away, outside of the casing, is a very nonlinear function of the current. In terms of casing correction factors, this means that the casing correction factor for the transmitter is a function of transmitter current and field strength. Thus, it may not be possible to use the transmitter as a receiver since the sensor's behavior as a receiver will result in a substantially different field strength than when the same is operated as a transmitter. It is still possible to generalize the result from above to calibrate the transmitter.

Referring again to FIG. 3, we see that at least one of the sensors is operated as either a transmitter or a receiver. This is equally true when calibrating the transmitter, except that the primary transmitter may be operated only as a transmitter.

Figure 8:
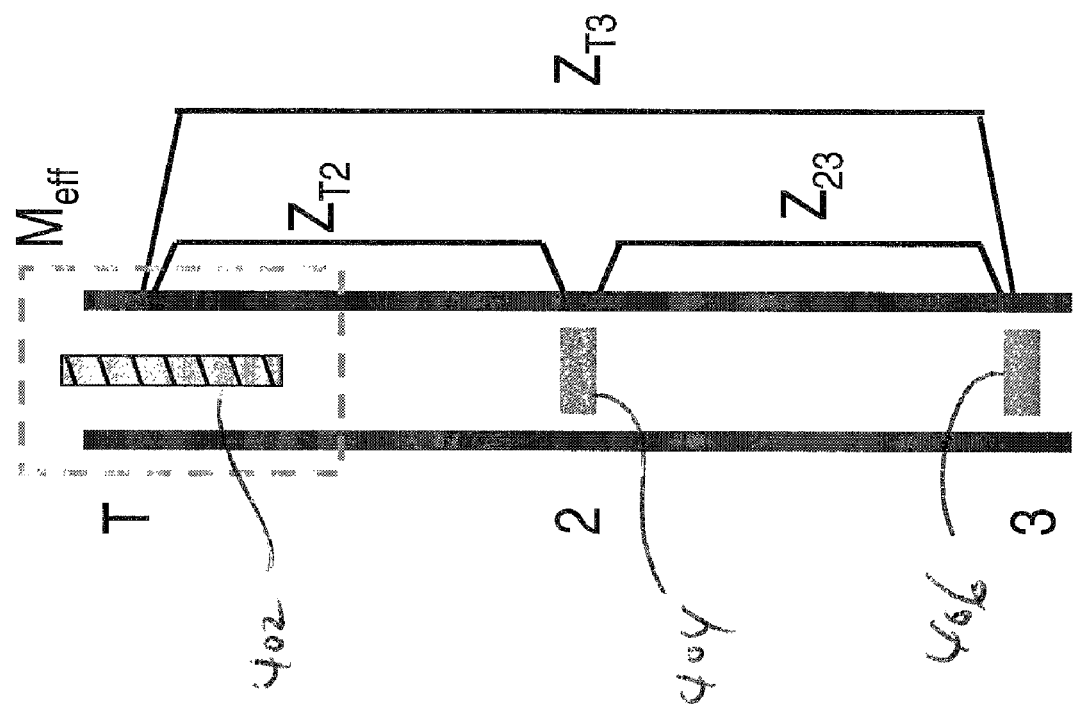
FIGS. 7 and 8 illustrate yet another transmitter/receiver arrangement according to embodiments of the present disclosure to determine lining structure correction factors.

FIG. 8 is similar to FIG. 7, but FIG. 8 shows a transmitter 402 and two receivers 404, 406. Calibration can proceed as above, except that in the arrangement of FIG. 8, the transmitter 402 is used as a transmitter only. From the first expression (for $k_1$) of Eq. 26, the casing correction factor $k_1$ for the transmitter 402 can be obtained. Since this is a direct measure of the effective moment of the transmitter 402, the measurement automatically includes all of the details of the transmitter 402 that are either unknown or extremely difficult to model. These effects include: transmitter current, transmitter core, drive waveform, spatial dependence of $\sigma$ and $\mu$, spatial dependence of core and casing dimensions, collars, eccentering, nonlinear effects in core and casing, remnant magnetization in core and casing, polarization of core and casing, interaction between different harmonics, changes in electrical or magnetic properties due to temperature, pressure or aging.

Since the technique above is a direct measurement of the field produced by the transmitter, it is sensitive only to the effective moment of the transmitter. The moment is the same whether the field is measured inside of the casing sufficiently far away from the transmitter or at a distance outside the casing.

Figure 9:
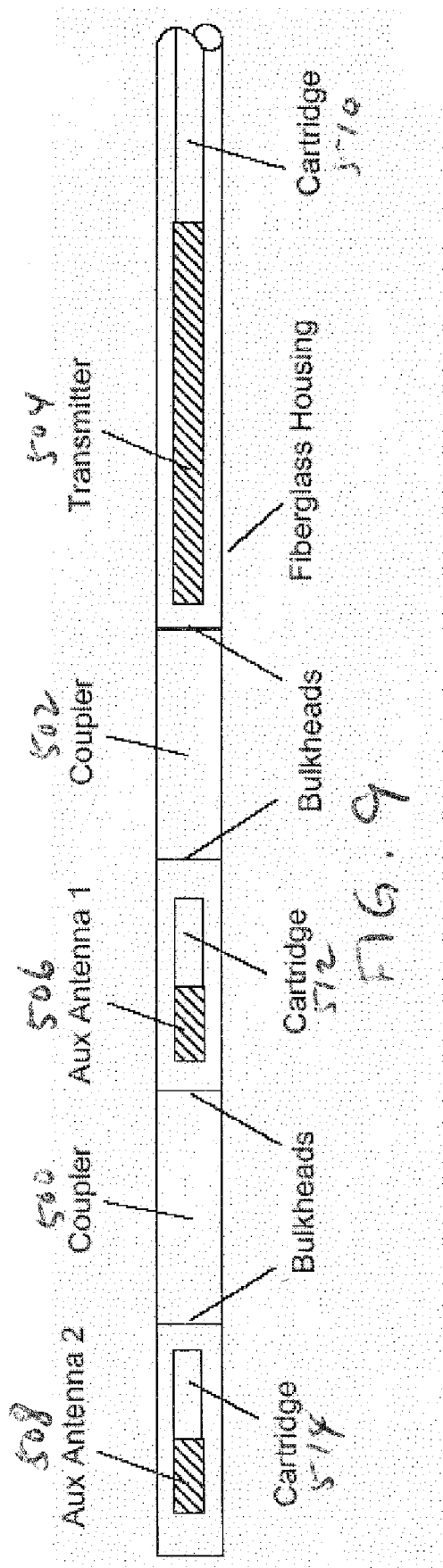
FIG. 9 illustrates a tool having a transmitter and receivers in accordance with embodiments of the present disclosure.

Another issue in performing measurements according to the example techniques above is eliminating any parasitic coupling among antennas (e.g., the coils in transmitters and receivers). A transmitter that is driven with significant current and voltage can be located in the same tool string as a receiver that is attempting to measure small magnetic fields. There are various ways to minimize or reduce coupling between such transmitter and receiver, minimizing direct electrical contact between the antenna sections caused by through-wires. In one example, as depicted in FIG. 9, inductive couplers 500, 502 separate the three antennas 504, 506, and 508. The antenna 504 can be for a transmitter, while antennas 506 and 508 can be for auxiliary receivers. The inductive couplers 500 and 502 may each include an air gap between the primary and secondary inductive coupler portions to keep the capacitive coupling small. The air gaps may be omitted in other implementations. In some embodiments, capacitive shields cover the antennas. Power and telemetry can be passed at a high frequency between the antenna sections. The inductive coupler 500, 502 is efficient at high frequency to pass power and telemetry, but is inefficient at the transmitter frequency.

As depicted in FIG. 9, cartridges 510, 512, and 514 are associated with respective antennas 504, 506, and 508. The cartridges 510, 512, and 514 include electronic circuitry to perform related tasks, such as to cause transmission by a transmitter or to enable detection by a receiver.

Figure 10:
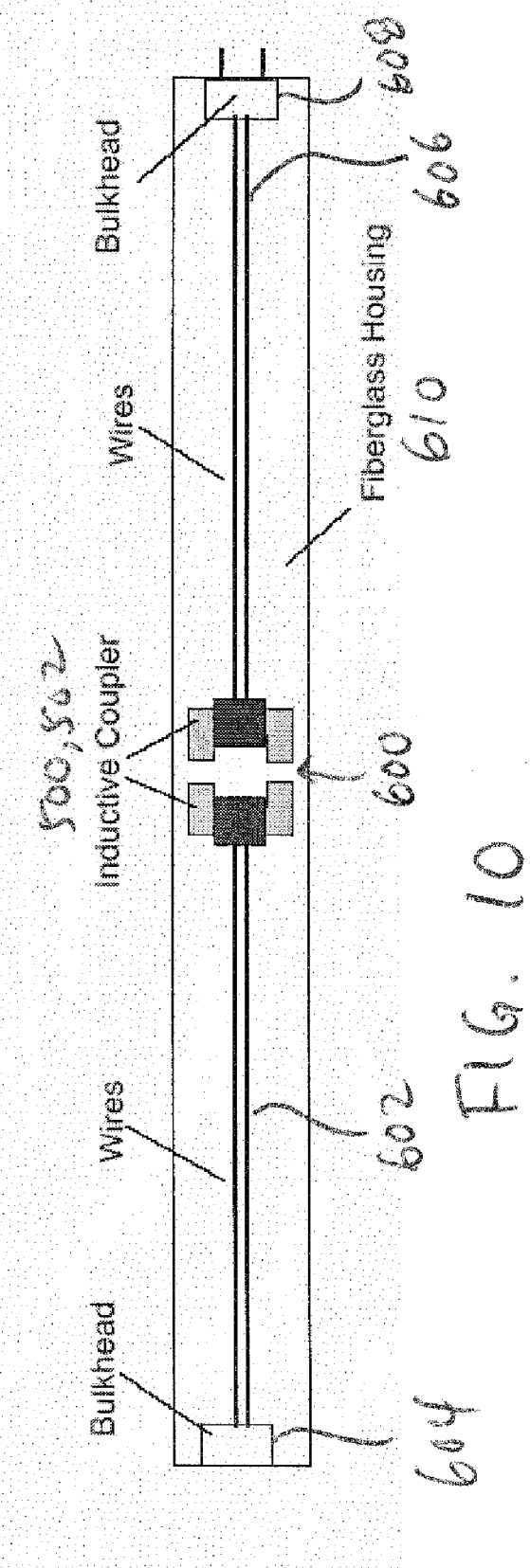
FIG. 10 illustrates an inductive coupler used in the tool of FIG. 9 to reduce coupling between the transmitter and receivers in accordance with embodiments of the present disclosure.

FIG. 10 shows an example inductive coupler that has an air gap 600 between inductive coupler portions. The left inductive coupler portion is connected by wires 602 to a bulkhead 604 for connection to the next section of the tool, while the right inductive coupler portion is connected over wires 606 to a bulkhead 608 for connection to another section of the tool. The components of FIG. 10 can be provided in a fiberglass housing 610 (or in another type of housing).

In various embodiments, the above may be achieved with a number of sensors exceeding the minimum of three described above for embodiments having no constraints. In considering the number of sensors that are needed in order to determine all the effective areas by measuring the cross-couplings, there are concerns about some of the constraints on separability and signal strength. Assuming no constraints, only 3 sensors are needed.

If, however, minimum and maximum spacing constraints are assumed, additional sensors may be necessary to accomplish the methods of the present disclosure. The constraint most often measured is that the spacing between two receivers must be at least twice the inter-receiver spacing. With 4 sensors, we have only to following:

$$A_{13} = A_1 A_3$$

$$A_{14} = A_1 A_4$$

$$A_{24} = A_2 A_4 \qquad \text{(Eq. 28)}$$

which is inadequate to determine 4 coefficients. Under such constraints, it results that at least 5 sensor are sufficient for determining all the coefficients, even if we assume that the minimum spacing is 2 and the maximum is 3.

$$A_{13} = A_1 A_3 \qquad \text{(Eq. 29)}$$

$$A_{14} = A_1 A_4$$

$$A_{24} = A_2 A_4$$

$$A_{25} = A_2 A_5$$

$$A_{35} = A_3 A_5$$

$$A_1 = \sqrt{\frac{A_{13} A_{14} A_{25}}{A_{24} A_{35}}}$$

$$A_2 = \sqrt{\frac{A_{13} A_{24} A_{25}}{A_{14} A_{35}}}$$

$$A_3 = \sqrt{\frac{A_{13} A_{24} A_{35}}{A_{14} A_{25}}}$$

$$A_4 = \sqrt{\frac{A_{14} A_{24} A_{35}}{A_{13} A_{25}}}$$

$$A_5 = \sqrt{\frac{A_{14} A_{25} A_{35}}{A_{13} A_{24}}}$$

The casing correction factors determined according to methods disclosed above may be applied to eliminate the effect of one or more casings in various applications. For example, improved evaluation of a reservoir including cross-well techniques, surface-to-borehole techniques, and single well evaluation techniques is achieved by applying the casing correction factors in each scenario to take into account the effect of the casing in a single well (for surface-to-borehole or single well techniques) or in a plurality of wells. Additionally, the casing correction factors may be used to improved drilling techniques for parallel wells, such as with steam assisted gravity drainage drilling, well avoidance in scenarios having a plurality of wells in close proximity to one another, and well intersection techniques (as generally described in U.S. patent application Ser. No. 11/833,032, entitled "Magnetic Ranging While Drilling Parallel Wells," filed Aug. 2, 2007. Further applications may also include improved casing evaluation for examining the status of casing already in place, for instance to evaluate the state of corrosion of the casing, and improved reservoir monitoring (e.g., resistivity, conductivity, and fluid invasion generally) through casing.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining the effect on a magnetic field caused by a lining structure in a wellbore, comprising:
    deploying, into the wellbore lined with the lining structure, an array comprising a plurality of sensors including sensor A configured to operate as a transmitter, sensor B configured to operate as either a transmitter or a receiver, and sensor C configured to operate as a receiver;
    activating sensor A as a transmitter and measuring magnetic fields with sensors B operating as a receiver and with sensor C;
    activating sensor B as a transmitter and measuring magnetic fields with sensor C; and
    calculating, based on the measured magnetic fields, a plurality of lining structure correction factors.

2. The method of claim 1, wherein the sensors comprise wire loops.

3. The method of claim 2, wherein at least one of the sensors is disposed about a permeable core.

4. The method of claim 1, wherein sensor B comprises one transmitter and one receiver that are substantially co-located in the array.

5. The method of claim 1, wherein sensor B comprises one transmitter and one receiver disposed about a common coil form.

6. The method of claim 5, wherein one of sensors is configured to operate as both a transmitter and a receiver.

7. The method of claim 1, further comprising operating at least one sensor in a nonlinear mode such that the magnetic field strength is not linearly proportional to the sensor current.

8. The method of claim 7, further comprising calculating the effective transmitter moment.

9. The method of claim 1, further comprising calculating the plurality of lining structure correction factors at multiple positions corresponding to the positions of the transmitters and receivers.

10. The method of claim 9, further comprising calculating the plurality of lining structure correction factors without multiple indications of casing properties.

11. The method of claim 1, wherein the plurality of lining structure correction factors include attenuation due to the casing.

12. The method of claim 1, wherein the plurality of lining structure correction factors include phase shift due to the casing.

13. The method of claim 1, further comprising deploying a feedback sensor substantially co-located with at least one of the sensors.

14. The method of claim 13, further comprising calculating a casing correction factor for the feedback sensor based on the ratio of the measured fields at the feedback sensor and at the substantially co-located sensor.

15. The method of claim 13, wherein the feedback sensor comprises a common winding with sensor C and an additional winding.

16. The method of claim 15, wherein the additional winding is activated with a feedback circuit.

17. The method of claim 16, wherein a casing effect for the feedback sensor is computed by measuring the ratios $$\frac{V_{Feedback\_Casing}}{V_{Straight\_Casing}} \text{ and } \frac{V_{Feedback\_Air}}{V_{Straight\_Air}},$$

thereby obtaining the feedback sensor casing correction factor as $$k_{Feedback} = k_{Straight} \frac{V_{Feedback\_Casing} V_{Straight\_Air}}{V_{Straight\_Casing} V_{Veedback\_Air}}.$$

18. The method of claim 1 further comprising an inductive coupler between sensors to reduce parasitic coupling.

19. The method of claim 1, further comprising:
    deploying a second array into a second wellbore lined with a second lining structure,
        where the second array comprising an array comprising a plurality of sensors including sensor A configured to operate as a transmitter, sensor B configured to operate as either a transmitter or a receiver, and sensor C configured to operate as a receiver;
    activating sensor A as a transmitter and measuring magnetic fields with sensors B operating as a receiver and with sensor C;
    activating sensor B as a transmitter and measuring magnetic fields with sensor C; and
    calculating, based on the measured magnetic fields, a plurality of lining structure correction factors for the second well.

20. A system, comprising:
    an array of elements deployable into a wellbore lined with an electrically conductive lining structure, wherein the elements comprise a plurality of sensors including sensor A configured to operate as a transmitter, sensor B configured to operate as either a transmitter or a receiver, and sensor C configured to operate as a receiver; and
    a controller operable to:
        activate sensor A;
        measure a plurality of magnetic fields at sensor C and sensor B as a receiver;
        activate sensor B as a transmitter;
        measure magnetic fields at sensor C; and
        compute a plurality of lining correction factors based on the measurements.

21. The system of claim 20, wherein the controller is further configured to measure voltages.

22. The system of claim 20, wherein the controller is further configured to calculate the effect of the formation using the computed correction factors.

* * * * *